United States Patent
Schneider et al.

(10) Patent No.: US 9,481,345 B2
(45) Date of Patent: Nov. 1, 2016

(54) CONTROL DEVICE OF A MOTOR VEHICLE AND METHOD FOR OPERATING SAME

(75) Inventors: Florian Schneider, Lindenberg (DE); Thomas Jaeger, Meckenbeuren (DE); Roland Mair, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 7 days.

(21) Appl. No.: 14/344,961

(22) PCT Filed: Sep. 13, 2012

(86) PCT No.: PCT/EP2012/067906
§ 371 (c)(1),
(2), (4) Date: Mar. 14, 2014

(87) PCT Pub. No.: WO2013/053563
PCT Pub. Date: Apr. 18, 2013

(65) Prior Publication Data
US 2014/0309901 A1    Oct. 16, 2014

(30) Foreign Application Priority Data

Oct. 12, 2011  (DE) .................. 10 2011 084 339

(51) Int. Cl.
*B60T 8/17* (2006.01)
*B60T 8/18* (2006.01)
(Continued)

(52) U.S. Cl.
CPC .............. *B60T 8/17* (2013.01); *B60T 7/122* (2013.01); *B60T 8/172* (2013.01); *B60T 8/18* (2013.01);
(Continued)

(58) Field of Classification Search
CPC .......... B60T 8/17; B60T 7/122; B60T 8/172; B60T 8/18

USPC .......................................................... 701/70
See application file for complete search history.

(56) References Cited

U.S. PATENT DOCUMENTS 5,916,062 A    6/1999  Siepker
6,039,673 A *  3/2000  Mikami ................. F16H 61/20
                                                             477/93
(Continued)

FOREIGN PATENT DOCUMENTS

DE    1 926 592 A1    11/1970
DE    40 11 850 A1    10/1990
(Continued)

OTHER PUBLICATIONS

German Search Report Corresponding to 10 2011 084 339.6 mailed Dec. 7, 2011.
(Continued)

*Primary Examiner* — Mussa A Shaawat
*Assistant Examiner* — Yazan Soofi
(74) *Attorney, Agent, or Firm* — Davis & Bujold, PLLC; Michael J. Bujold

(57) ABSTRACT

A control device for a motor vehicle such that during a driving direction change from an original direction and/or during a starting process and/or during a stopping process and/or during a rolling process, in order to assist with the driving direction change and/or starting process and/or stopping process and/or rolling process, an appropriate control signal is provided by the control device to automatically activate a service brake. The control device automatically determines the friction energy produced at a starting clutch, during the driving direction change and/or starting process and/or stopping process and/or rolling process, without activation of the service brake. The control device only automatically activates the service brake, to assist with the driving direction change and/or starting process and/or stopping process and/or rolling process, if the determined friction energy exceeds a limit value.

17 Claims, 1 Drawing Sheet

(51) Int. Cl.

| | | |
|---|---|---|
| *B60T 8/172* | (2006.01) | |
| *B60T 7/12* | (2006.01) | |
| *B60W 10/02* | (2006.01) | |
| *B60W 10/08* | (2006.01) | |
| *B60W 10/11* | (2012.01) | |
| *B60W 10/18* | (2012.01) | |
| *B60W 20/00* | (2016.01) | |
| *B60T 8/24* | (2006.01) | |
| *B60T 8/32* | (2006.01) | |
| *B60W 30/18* | (2012.01) | |

(52) U.S. Cl.
CPC .............. *B60T 8/245* (2013.01); *B60T 8/32* (2013.01); *B60T 8/3205* (2013.01); *B60W 10/02* (2013.01); *B60W 10/08* (2013.01); *B60W 10/11* (2013.01); *B60W 10/182* (2013.01); *B60W 20/00* (2013.01); *B60W 20/14* (2016.01); *B60W 30/18027* (2013.01); *B60W 30/18118* (2013.01); *B60T 2201/06* (2013.01); *B60T 2230/08* (2013.01); *B60W 30/18045* (2013.01); *B60W 2510/0241* (2013.01); *B60W 2510/0275* (2013.01); *B60W 2520/06* (2013.01); *B60W 2550/142* (2013.01); *B60W 2710/1005* (2013.01); *B60W 2710/186* (2013.01)

(56) References Cited

U.S. PATENT DOCUMENTS

| | | | |
|---|---|---|---|
| 6,199,001 B1* | 3/2001 | Ohta et al. | ............. 701/51 |
| 6,302,227 B1 | 10/2001 | Takemura et al. | |
| 6,411,881 B1* | 6/2002 | Thomas | ............. B60T 7/122 |
| | | | 180/69.6 |
| 6,655,485 B1* | 12/2003 | Ito et al. | ............. 180/65.6 |
| 6,811,015 B2 | 11/2004 | Tietze | |
| 7,097,021 B2 | 8/2006 | Takamura et al. | |
| 2001/0022245 A1* | 9/2001 | Rogg | ............. 180/65.2 |
| 2002/0082136 A1* | 6/2002 | Endo et al. | ............. 477/83 |
| 2003/0109359 A1* | 6/2003 | Eguchi et al. | ............. 477/174 |
| 2004/0067818 A1* | 4/2004 | Obermeier-Hartmann et al. | ............. 477/170 |
| 2007/0270281 A1* | 11/2007 | Inoue | ............. B60W 10/02 |
| | | | 477/180 |
| 2010/0094513 A1* | 4/2010 | Mair | ............. 701/48 |
| 2010/0114443 A1* | 5/2010 | Terwart et al. | ............. 701/68 |
| 2012/0150396 A1* | 6/2012 | Ajimoto et al. | ............. 701/52 |

FOREIGN PATENT DOCUMENTS

| | | |
|---|---|---|
| DE | 100 02 133 A1 | 8/2000 |
| DE | 102 50 730 A1 | 6/2003 |
| DE | 10 2004 011 113 A1 | 10/2004 |
| EP | 0 822 129 A1 | 2/1998 |
| EP | 1 300 279 A2 | 4/2003 |
| WO | 02/094602 A1 | 11/2002 |
| WO | 2004/067312 A2 | 8/2004 |
| WO | 2011/112138 A1 | 9/2011 |

OTHER PUBLICATIONS

International Search Report Corresponding to PCT/EP2012/067906 mailed Dec. 18, 2012.
Written Opinion Corresponding to PCT/EP2012/067906 mailed Dec. 18, 2012.

* cited by examiner

CONTROL DEVICE OF A MOTOR VEHICLE AND METHOD FOR OPERATING SAME

This application is a National Stage completion of PCT/EP2012/067906 filed Sep. 13, 2012, which claims priority from German patent application Ser. No. 10 2011 084 339.6 filed Oct. 12, 2011.

FIELD OF THE INVENTION

The invention concerns a control device of a motor vehicle. Furthermore, the invention concerns a method for operating a motor vehicle.

BACKGROUND OF THE INVENTION

From DE 1 926 592 A1 a method and a device for operating a motor vehicle designed as a working vehicle are known, wherein after shifting a shift lever to a new driving direction, i.e. when the driving direction is changed, a drive unit of the motor vehicle is switched off and brakes of the motor vehicle are applied, and wherein after the motor vehicle has been brought to rest thereby, the brakes are released and the drive unit is switched on in the new driving direction.

WO 02/094602 A1 concerns a method for carrying out a driving direction reversal in a moving vehicle, such that when a transmission selector lever is moved to a new driving direction position, to assist the driving direction reversal, brakes of the motor vehicle are activated depending on actuation of the accelerator pedal of the motor vehicle.

From EP 0 822 129 B1 a method is known for assisting a starting process of a motor vehicle, wherein a stationary condition of the motor vehicle is secured by braking action and the braking action ends when an engine torque exceeds a limit value. The braking action to steady the motor vehicle is built up if a braking force exerted by the driver is not sufficient to hold the vehicle at rest, and the increase of braking pressure takes place at the beginning of the automatic braking action as a function of the vehicle's speed.

SUMMARY OF THE INVENTION

Starting from there the purpose of the present invention is to provide a new type of control device for a motor vehicle and a new type of method for operating a motor vehicle.

This objective is achieved by a control device according to the invention, during a driving direction change and/or a starting process and/or a stopping process and/or a rolling process, without activating the service brake the control device automatically determines the friction energy produced at a starting clutch, and to assist the driving direction change and/or the starting process and/or the stopping process and/or the rolling process, the control device only automatically activates the service brake if the friction energy determined exceeds a limit value.

With the invention, it is proposed for the first time, that to assist a driving direction change of a moving motor vehicle and/or to assist a starting process and/or a stopping process and/or a rolling process, the service brake is activated depending on whether the friction energy produced at the starting clutch of the motor vehicle without activating the service brake during the driving direction change and/or the starting process and/or the stopping process and/or the rolling process is less than a limit value. If the driving direction change and/or the starting process and/or the stopping process and/or the rolling process can be carried out without activating the service brake with no risk of damaging the starting clutch, then according to the invention the service brake is not activated. Only if, as a result of carrying out the driving direction change and/or the starting process and/or the stopping process and/or the rolling process without activating the service brake, the starting clutch might be damaged, is the service brake automatically activated in order to assist the driving direction change and/or the starting process and/or the stopping process and/or the rolling process. In this way comfortable operation of the motor vehicle can be ensured without risk of damaging the starting clutch.

Preferably, the control device automatically activates the service brake to assist a driving change of a moving motor vehicle only if, when the driving direction change is called for, the driving speed is higher than a lower limit value and lower than an upper limit value.

This concept of the invention is based on the realization that when a driving direction change is carried out at a driving speed lower than the lower limit value, the driving direction change can be carried out comfortably and with no risk of damaging the starting clutch even without activating the service brake.

Furthermore, this concept of the invention is based on the realization that if the driving speed is above the upper limit value, a driving direction change should not be carried out for safety reasons, since in such a case a driving direction change initiated by the driver must be based on an erroneous operation of a transmission selector lever.

Preferably, the control device automatically activates the service brake to assist a starting process from a rolling direction opposite to a desired starting direction, only if an inclination of the motor vehicle exceeds a limit value and/or a starting gear is engaged in the transmission and/or, while rolling in the direction opposite to the desired starting direction, an acceleration of the motor vehicle is higher than a limit value, and/or when a rolling distance of the motor vehicle is longer than a limit value.

The above criteria allow a particularly advantageous braking action to assist a starting process.

In an advantageous further development, the control device determines a braking intensity when the service brake is activated, which depends on a mass of the motor vehicle and/or depends on an inclination of the motor vehicle and/or depends on a driving speed of the motor vehicle when a driving direction change is called for and/or depends on accelerator pedal actuation, namely preferably in such manner that in the case of a driving direction change, a delay of the braking action and a subsequent acceleration of the motor vehicle are approximately of equal magnitude.

If the braking intensity is determined such that a deceleration by the braking action is approximately the same magnitude as a subsequent acceleration of the motor vehicle during the driving direction change, this enables the driving direction change to take place particularly comfortably.

According to another advantageous further development, in a motor vehicle with a hybrid drive comprising an internal combustion engine and an electric machine, the control device additionally determines automatically the energy produced by the electric machine operating as a generator without activation of the service brake, so that depending on this, the control device automatically activates the service brake and/or the generator operation of the electric machine to assist the driving direction change and/or the starting process and/or the stopping process and/or the rolling process.

With this advantageous further development of the invention, it is made possible in a simple and reliable manner, in a hybrid vehicle, to take into account a braking action that can be provided by the electric machine of the hybrid drive. Depending on the friction energy produced at the starting clutch and also depending on the energy generated by the electric machine during generator operation, the service brake and/or the generator operation of the electric machine are activated automatically to assist the driving direction change and/or the starting process and/or the stopping process and/or the rolling process.

The method according to the invention for operating a motor vehicle is defined below.

BRIEF DESCRIPTION OF THE DRAWINGS

Preferred further developments of the invention emerge from the description given below. Example embodiments of the invention, to which it is not limited, are explained in more detail with reference to the drawings, which show.

DETAILED DESCRIPTION OF THE PREFERRED EMBODIMENTS

Figure 1:
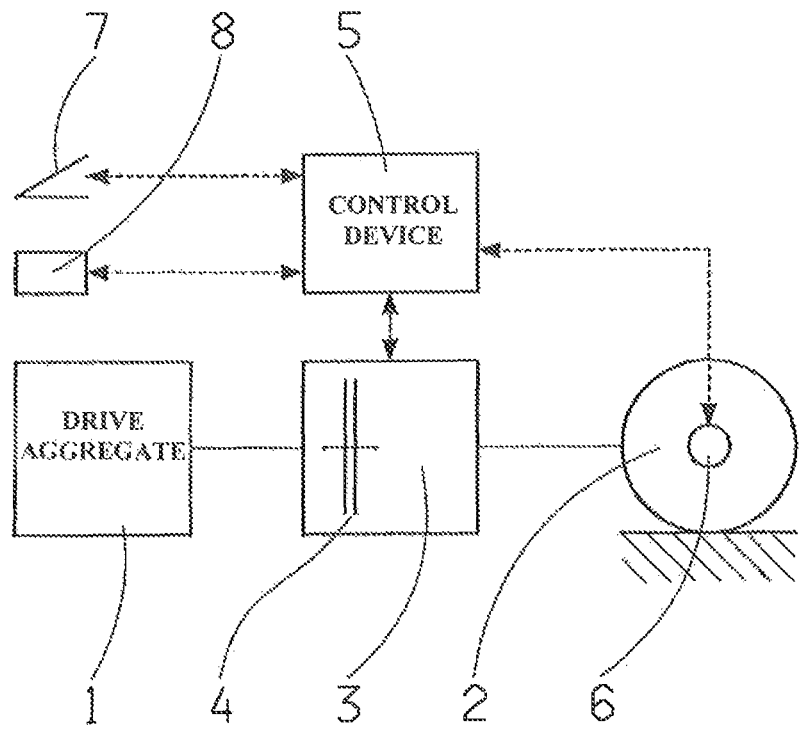
FIG. 1: An example diagram representing a vehicle.

The invention concerns a control device for a motor vehicle and a method for operating the motor vehicle. Below, an example of the invention is described with reference to the drive-train diagrams shown in FIGS. 1 and 2. FIG. 1 shows in diagrammatic form a drive-train layout with a drive aggregate 1 and a transmission 3 connected between the drive aggregate 1 and a drive output 2, wherein the transmission 3 is preferably an automated variable-speed transmission as used in commercial vehicles. Such an automated variable-speed transmission 3 has an automated, dry and frictional starting clutch 4 as well as interlock-type shifting elements (not shown) for carrying out a gearshift in the transmission. Associated with the automated transmission 3 is a control device 5 designed as a transmission control unit, which controls and/or regulates the operation of the automated transmission 3 and the operation of the automated starting clutch 4. For that purpose the control device 5 exchanges data with the transmission 3. Furthermore, FIG. 1 shows a service brake 6 associated with the drive output 2, by means of which a braking torque force can be applied at the drive output 2. FIG. 1 also shows an accelerator pedal 7 and an inclination sensor 8 which, like the transmission 3 and the service brake 6, also exchange data with the transmission control device 5.

When, in such a vehicle, the original course of the motor vehicle is to be changed by a driving direction change from forward to reverse driving and/or from reverse driving to forward driving and/or a starting process and/or a stopping process and/or a rolling process is to be carried out, this driving direction change and/or starting process and/or stopping process and/or rolling process is automatically assisted by the control device 5, namely by automatic activation of the service brake 6, but the service brake 6 is only activated automatically in order to assist the driving direction change and/or the starting process and/or the stopping process and/or the rolling process if the friction energy produced at the starting clutch 4 of the motor vehicle during the driving direction change and/or starting process and/or stopping process and/or rolling process, without activating the service brake 6, exceeds a limit value.

Thus, when a driving direction change and/or a starting process and/or a stopping process and/or a rolling process is/are to be carried out, if as a result of the friction energy expected at the dry, frictional, automated starting clutch 4 of the variable-speed transmission 3 the wear taking place would be too severe, then according to the invention the service brake 6 is automatically activated in order to relieve the load on the starting clutch. In this way a comfortable driving direction change and/or starting process and/or stopping process and/or rolling process can be carried out without risk of damaging the starting clutch 4.

The above limit value for the friction energy produced at the starting clutch 4, which when it is exceeded causes the service brake 6 to be automatically activated by the control device 5, can be recorded or stored in the control device 5 as a static limit value. Alternatively, the control device 5 can determine the limit value dynamically, in particular as a function of a friction energy produced at the starting clutch 4 with activation of the service brake 6, and in that case the service brake 6 is only activated automatically if a difference between the friction energy produced at the starting clutch 4 with and without activating the service brake 6 is larger than a limit value, in particular larger than zero.

To assist a driving direction change from an original course of the motor vehicle, namely by assisting a driving direction change either from forward driving to purely reverse driving or from reverse driving to forward driving, the service brake 6 is only activated automatically by the control device 5 if, when the driver calls for the driving direction change, the driving speed of the motor vehicle is higher than a lower limit value and at the same time lower than an upper limit value. If the speed is lower than the lower limit value, i.e. if a minimum speed is not being exceeded, the driving direction change can take place comfortably and with no risk of damaging the starting clutch 4 even without any braking action by the service brake 6.

If the driving speed is higher than a maximum speed, the braking action by activating the service brake 6 is not permitted since in such a case, if the driver initiates a driving direction change, this is very probably a mistake since when the driving speed is higher than the upper limit value and therefore higher than a maximum speed, the driving direction change makes no sense.

When a driving direction change away from an original course of the motor vehicle is to be carried out, namely a driving direction change either from forward to reverse driving or from reverse to forward driving, then to assist the driving direction change the transmission 3 of the motor vehicle is first automatically shifted by the control device 5 to neutral. Only thereafter, i.e. with the transmission 3 in neutral, does the control device 5 then, for the further assistance of the driving direction change, automatically activate the service brake 6 or the braking action by the service brake 6 upon the drive output 2.

When the transmission 3 has been shifted to neutral, as a braking action a transmission brake can also be used and called for by the control device 5. By calling for the transmission brake the time for carrying out the driving direction change can be made shorter.

When, in order to assist a driving direction change, the control device 5 shifts the transmission 3 to neutral before the activation of the service brake 6, then immediately after the driver calls for the driving direction change the driver is alerted, by virtue of the transmission's shift to neutral, to the fact that the driving direction change has been taken over by the control system and is being prepared for. For a driver, this results in comprehensible and logical driving behavior of the motor vehicle. A further advantage of this procedure is that the starting clutch 4 is no longer operated at a rotational speed which does not match the rotational direction of the drive aggregate 1.

When the driving direction change is carried out under control by the control device 5, in particular by the above shifting of the transmission 3 to neutral, and the control device 5 detects that while the driving direction change is in progress the driver has actuated the accelerator pedal immediately after calling for the driving direction change, it can be provided that the control device 5 nevertheless completes the driving direction change, or alternatively discontinues it.

The decision whether to complete or discontinue the driving direction change can preferably be made to depend on how long the time interval is between the accelerator pedal actuation and the demand for a driving direction change. If that interval is relatively short the driving direction change is discontinued, whereas in contrast if the interval is relatively long the driving direction change is carried out.

Likewise, the decision whether a driving direction change when the driver has actuated the accelerator pedal 7 after calling for the driving direction change should be carried out or discontinued, can depend on a speed of the motor vehicle. If the speed is relatively low, the driving direction change is carried out, whereas in contrast if the driving speed of the motor vehicle is relatively high, the driving direction change is discontinued.

The control device 5 automatically determines a braking intensity for the activation of the service brake 6, preferably as a function of a mass of the motor vehicle and/or depending on an inclination signal provided by an inclination sensor 8 of the motor vehicle and/or depending on the driving speed of the motor vehicle at the time when the driver calls for the driving direction change and/or depending on an actuation of the accelerator pedal 7 by the driver.

In this case the braking intensity can preferably be determined by the control device 5 such that a deceleration by the braking action of the service brake 6 and a subsequent acceleration of the motor vehicle when the service brake 6 is deactivated, are of approximately the same size. This enables the control system to carry out a particularly comfortable driving direction change.

Likewise, the braking intensity can be determined such that the driving direction change, in particular the braking process of the motor vehicle required for it, is completed in a specified time. It is then possible for the control system to carry out a driving direction change within a defined time.

In particular, the control device 5 can also determine the braking intensity depending on a previously carried out activation of driver assistance systems so that particularly if, before the driver calls for a driving direction change, the control device 5 detects an action by an ABS system or an ASR system or an ESP system, then only a low braking intensity is called for.

Likewise, in particular a low braking intensity is called for by the control device 5 for the service brake 6 to assist a driving direction change, if blocking wheels at the drive output 2 have previously been detected.

Following the activation of the service brake 6 by the control device 5, the control device 5 automatically deactivates the service brake 6, in particular when, due to the activation of the service brake 6, the driving speed of the motor vehicle falls below a limit value. This takes place before the motor vehicle has come to rest, in order to make use of any residual speed of the motor vehicle at interlocked shifting elements of the transmission 3 for the elimination of so-termed tooth-on-tooth positions.

The above procedure, which has been described in the context of carrying out a driving direction change of a moving motor vehicle from forward driving to reverse driving or from reverse driving to forward driving, can basically also be used to assist a starting process and/or a stopping process and/or a rolling process, especially to assist a starting process from a rolling direction opposite to a desired starting direction of the motor vehicle, in particular if before the actual starting process the motor vehicle is rolling in a downhill direction opposite to the desired starting direction. In such a case too, in order to assist the starting process the control device 5 automatically activates a service brake 6, namely when, unless the service brake is activated, a friction energy produced at the starting clutch 4 is above a limit value.

In this context, in a starting process the service brake 6 is only activated automatically if, while rolling in the direction opposite to the desired starting direction, an acceleration of the motor vehicle is higher than a limit value and/or a rolling distance of the motor vehicle is longer than a limit value.

It can be provided, when assisting the starting process, that the service brake is only activated automatically when the motor vehicle is operated on an incline, i.e. when an inclination of the motor vehicle signaled by the inclination sensor 8 is greater than a limit value and/or when a starting gear is engaged in the transmission.

Furthermore, it can be provided that when the motor vehicle is operated on an incline or an inclined road, and if the driver does not actuate the accelerator pedal 7, the service brake 6 is activated by the control device 5 if while rolling on the incline, the speed of the motor vehicle becomes higher than a limit value. In such a case the motor vehicle on the incline can be secured against inadvertent rolling away.

Moreover, it can be provided that if the control device recognizes a rocking-free function, it does not call for the service brake 6.

Furthermore, in the case of a motor vehicle whose driver's door is open, the control device 5 automatically activates the service brake 6 while the driver's door is open in order to ensure that the motor vehicle remains at rest.

In the case of special vehicles, for example garbage collection vehicles, it can be provided that the control device 5 activates the service brake 6 automatically if the garbage collection vehicle is operating on an incline and rolls backward downhill, namely when someone is standing on a foot-plate of the garbage collection vehicle. In such a case a threat of danger to the person standing on the foot-plate when the garbage collection vehicle rolls backward downhill, for example during a starting process of the garbage collection vehicle on an incline, in which it could perhaps roll backward, can be avoided.

In particular when the motor vehicle is operated on an incline, i.e. when starting on an incline, it is provided that the control device 5 only activates the service brake 6 when the driver actuates the accelerator pedal 7. In such a case the motor vehicle can be permitted to roll backward when the accelerator pedal 7 is not actuated. Likewise, in this case activation of the service brake 6 can be permitted only for a defined time, in order then to enable the motor vehicle to roll freely with no braking action by the service brake 6.

When a starting process takes place without actuation of the accelerator pedal 7 by the driver, this is also known as crawling of the motor vehicle. During crawling as well, the control device 5 can activate the service brake 6, namely in particular during crawling on an incline, the incline being recognized by evaluating an inclination signal from an inclination sensor 8 of the motor vehicle.

During crawling on an incline it can be ensured, by automatically activating the service brake 6, that the motor vehicle rolls on the incline at a maximum rolling speed, both when the motor vehicle is rolling backward and when it is rolling forward. During this the brake is actuated during crawling in co-ordination with the actuation of the starting clutch 4, in such manner that when the starting clutch 4 is closed, the service brake 6 is deactivated by the control device 5.

Figure 2:
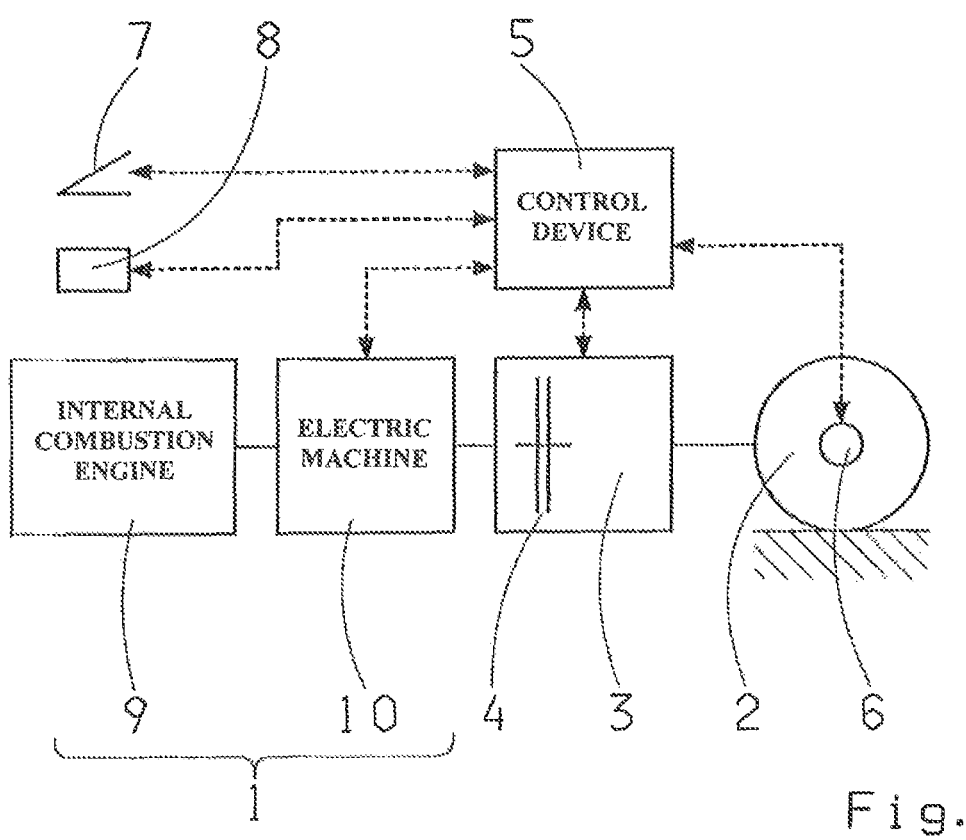
FIG. 2: A further example diagram representing a vehicle.

The invention can also be used in a motor vehicle that has a drive-train as shown in FIG. 2, the drive-train of FIG. 2 differing from the drive-train of FIG. 1 in that the drive aggregate 1 in the drive-train of FIG. 2, is in the form of a hybrid drive comprising an internal combustion engine 9 and an electric machine 10. In such a hybrid vehicle the control device 5 determines not only the friction energy produced at the starting clutch 4 when the service brake 6 is not activated during a driving direction change and/or a starting process and/or a stopping process and/or a rolling process, but rather, it additionally determines automatically the energy generated by the electric machine 10 operating as a generator when the service brake 6 has not been activated, during a driving direction change and/or a starting process and/or a stopping process and/or a rolling process. Depending on the friction energy at the starting clutch 4 and the energy generated by the electric machine 10, the control device 5 activates the service brake 6 and/or the generator operation of the electric machine in order to assist the driving direction change and/or starting process and/or stopping process and/or rolling process. Thus, a braking torque can be applied by means of an electric machine 10 in the drive-train operated as a generator. That braking torque can then be used for charging an electrical energy accumulator (not shown), although however, if too much energy or power is produced by operating the electric machine 10 as a generator, then to avoid damaging electric or electronic assemblies in the hybrid vehicle the generator-induced braking torque or brake energy produced by the electric machine 10 has to be limited, namely by automatic activation of the service brake 6 by the control device 5.

In the context of a starting process of a motor vehicle it can be provided that after starting up the drive aggregate 1, the control device 5 always automatically activates the service brake 6 for a defined time after an engine start, in order to prevent the motor vehicle from moving off inadvertently, by holding the motor vehicle at rest for a defined time.

Likewise, when a motor vehicle is parked after a stopping process, once the drive aggregate 1 has been switched off the service brake 6 can be activated automatically in order to, automatically, hold a parked motor vehicle at rest.

In motor vehicles with so-termed stationary auxiliary drive outputs, i.e. ones which only operate when the vehicle is at rest, the service brake 6 can also be automatically activated while the auxiliary drive output is active in order to, automatically, hold the motor vehicle at rest.

Particularly in the case of commercial vehicles which are only permitted to drive at a maximum speed, for example 90 km/h, which is implemented by control means, when such vehicles are rolling downhill with the transmission in neutral, then in order to comply with the maximum speed limit the control device 5 can automatically activate the service brake 6 in accordance with the invention.

The method according to the invention can also be used when starting and/or stopping and/or rolling in congested traffic, particularly on a downhill stretch.

When a motor vehicle is stopped, the method according to the invention can be used in combination with a hill-holder function. When during a stopping process the motor vehicle has come to rest, the service brake 6 is preferably deactivated in order to allow subsequent rolling of the motor vehicle.

INDEXES

1 Drive aggregate
2 Drive output
3 Transmission
4 Starting clutch
5 Control device
6 Service brake
7 Accelerator pedal
8 inclination sensor
9 Internal combustion engine
10 Electric machine

The invention claimed is:

1. A control device (5) for a motor vehicle, the control device (5), during at least one of a driving direction change from an original direction, a starting process, a stopping process, and a rolling process, providing an appropriate control signal such that the control device (5) automatically activates a service brake (6) arranged on a drive output of the motor vehicle, to assist the at least one of the driving direction change, the starting process, the stopping process, and the rolling process,
    the control device (5) automatically determines friction energy produced at a starting clutch (4) during the at least one of the driving direction change, the starting process, the stopping process, and the rolling process without activation of the service brake (6),
    the control device only automatically activates the service brake (6), if the determined friction energy exceeds a limit value, to assist the at least one of the driving direction change, the starting process, the stopping process, and the rolling process, and
    the control device first automatically shifts a transmission (3) of the motor vehicle to neutral, and only then, when the transmission (3) is in neutral, the control device automatically activates the service brake (6) to apply a braking force on the drive output of the motor vehicle and assist the driving direction change.

2. The control device according to claim 1, wherein the limit value is stored in the control device (5) as a static value.

3. The control device according to claim 1, wherein the control device dynamically determines the limit value.

4. The control device according to claim 1, wherein the control device only automatically activates the service brake (6) when the driving direction change is called for, if a driving speed of the motor vehicle is higher than a lower limit value and lower than an upper limit value to assist the driving direction change.

5. The control device according to claim 1, wherein when the transmission (3) is in neutral, the control device additionally automatically activates a transmission brake.

6. The control device according to claim 1, wherein to assist the starting process when the motor vehicle is rolling in a rolling direction opposite to a desired starting direction, the control device only automatically activates the service brake (6), at least one of, if an inclination sensor detects that an inclination of the motor vehicle is greater than a omit value, and when a starting gear is engaged in the transmission (3).

7. The control device according to claim 1, wherein to assist the starting process when the motor vehicle is rolling in a rolling direction opposite to a desired starting direction, the control device only automatically activates the service brake (6) if, while rolling in the rolling direction opposite to the desired starting direction, at least one of an accelerator pedal actuation exceeds a different limit value and a rolling distance covered by the motor vehicle is longer than a further limit value.

8. The control device according to claim 1, wherein the control device is a transmission control unit of an automated variable-speed transmission with a frictional starting clutch.

9. The control device according to claim 1, wherein the motor vehicle has a hybrid drive comprising an internal combustion engine (9) and an electric machine (10), the control device additionally determines energy produced by the electric machine (10) operating as a generator when the service brake (6) is deactivated, and depending on the energy produced by the electric machine, the control device automatically activates at least one of the service brake (6) and the generator operation of the electric machine (10) to assist the at least one of the driving direction change, the starting process, the stopping process, and the rolling process.

10. The control device according to claim 1, wherein the control device determines a braking intensity of the service brake (6) at least one of:
as a function of a vehicle mass,
depending upon an inclination of the vehicle as determined by an inclination sensor,
depending on a driving speed at a time when the driving direction change is called for, and
depending upon an accelerator pedal actuation.

11. The control device according to claim 10, wherein the control device determines a braking intensity, for activating the service brake (6), in such manner that a deceleration by the braking action and a subsequent acceleration of the motor vehicle are approximately equal in magnitude.

12. The control device according to claim 1, wherein when a speed of the motor vehicle falls below a speed limit value, due to activation of the service brake (6), the control device automatically deactivates the service brake (6).

13. A method of operating a motor vehicle, having a drive aggregate, a transmission and a starting clutch, during at least one of a driving direction change from an original direction, a starting process, a stopping process and a rolling process, automatically activating a service brake arranged on a drive output of the motor vehicle to assist with the at least one of the driving direction change, the starting process, the stopping process and the rolling process, the method comprising the steps of:
automatically determining friction energy produced at the starting clutch, during the at least one of the driving direction change, the starting process, the stopping process, and the rolling process without activation of the service brake;
activating the service brake, if the determined friction energy exceeds a limit value, to apply a braking force on the drive output and assist with the at least one of the driving direction change, the starting process, the stopping process and the rolling process; and
automatically shifting, with the control device, the transmission (3) of the motor vehicle to neutral, and only then, when the transmission (3) is in neutral, automatically activating, with the control device, the service brake (6) to assist the driving direction change.

14. The method according to claim 13, further comprising the step of storing the limit value in the control device (5) as a static value.

15. A control device (5) of a motor vehicle for assisting with at least one of a driving direction change from an original direction, a starting process, a stopping process, and a rolling process,
the control device being connected to a service brake arranged on a drive output of the motor vehicle such that a control signal being transmittable during the at least one of the driving direction change, the starting process, the stopping process, and the rolling process, from the control device to the service brake (6) so as to automatically activate the service brake (6) to apply a braking force on the drive output of the motor vehicle,
the control device (5) being connected to a starting clutch (4) to automatically determine frictional energy produced by the starting clutch (4), during the at least one of the driving direction change, the starting process, the stopping process, and the rolling process, without activation of the service brake (6),
the control device only automatically activates the service brake (6), so as to assist the at least one of the driving direction change, the starting process, the stopping process, and the rolling process, if the determined frictional energy exceeds a limit value, and
the control device communicates with a transmission which is shiftable to a neutral position to assist the driving direction change, and the control device automatically shifts the transmission and subsequently the control device automatically activates the service brake to apply the braking force on the drive output of the motor vehicle only when the transmission is in the neutral position.

16. The control device according to claim 15, wherein to assist the starting process from a rolling direction opposite to a desired starting direction, the control device communicates with an inclination sensor and the control device only automatically activates the service brake (6) if an inclination of the motor vehicle as detected by the inclination sensor is greater than a different limit value and a starting gear in the transmission is engaged.

17. The control device according to claim 15, wherein to assist with the starting process from a rolling direction opposite to a desired starting direction, the control device communicates with an accelerator and the control device only automatically activates the service brake (6) if, while rolling in a direction opposite to a desired starting direction, at least one of accelerator actuation exceeds another limit value and rolling distance covered by the motor vehicle is longer than a further limit value.

* * * * *